Oct. 10, 1950  J. E. BROWDER  2,524,758
RADIO DIRECTION FINDING SYSTEM
Filed April 27, 1946
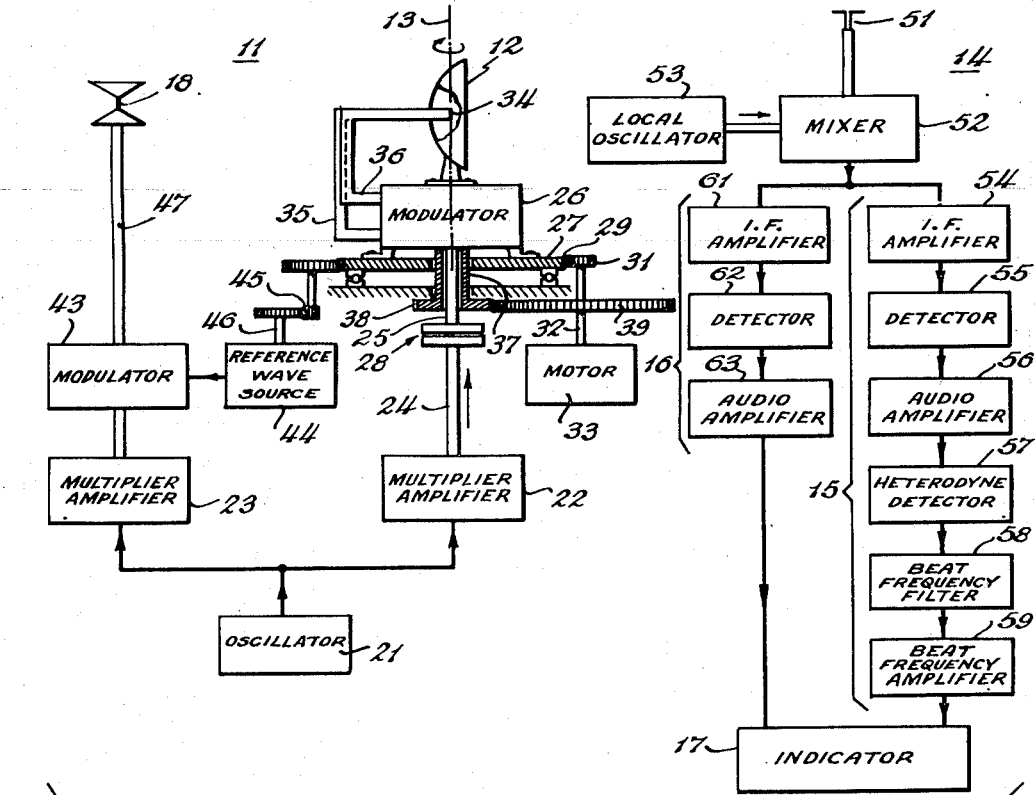
Fig. 3.   Fig. 1.
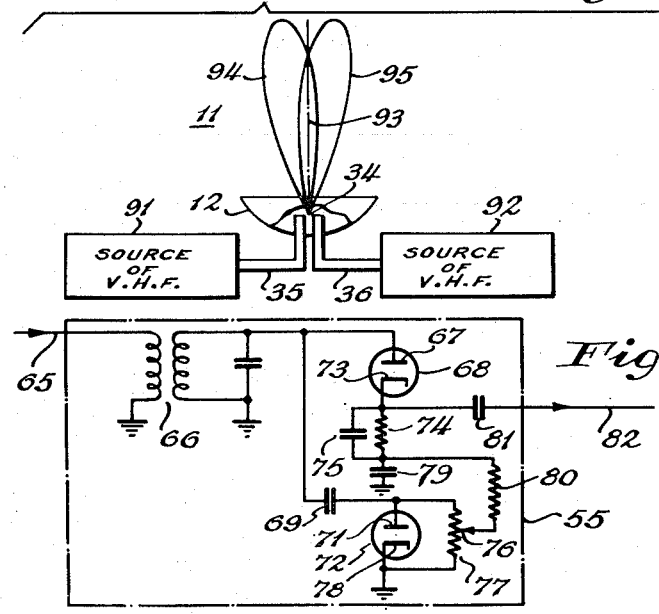
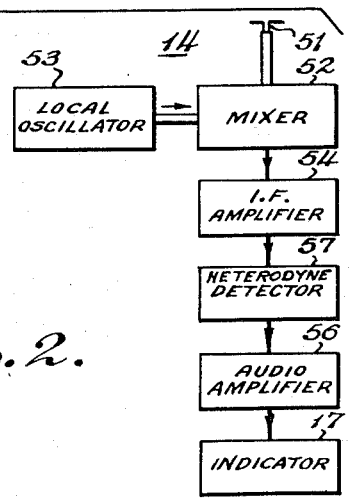
Fig. 2.
INVENTOR
JAY E. BROWDER
BY Paul B. Hunter
ATTORNEY Patented Oct. 10, 1950

2,524,758

UNITED STATES PATENT OFFICE 2,524,758

RADIO DIRECTION FINDING SYSTEM

Jay E. Browder, Garden City, N. Y., assignor to The Sperry Corporation, a corporation of Delaware Application April 27, 1946, Serial No. 665,397

13 Claims. (Cl. 343—106)

The present invention relates generally to radio direction finding systems and more particularly to improvements in apparatus for effectively sharpening the directional characteristics of radiation patterns.

Radio systems are well known which provide two partially overlapping beams of radio waves. These beams are customarily characteristically modulated to distinguish between them. A receiver, mounted in a mobile craft, receives the radio waves, separates the beam energies on the basis of their different modulation characteristics, rectifies the modulation signals, and opposes the resultant direct voltages so that when they are exactly balanced the craft is known to lie along an equi-signal line where the partially overlapping beams are received with equal intensity.

Rotary beacons are also known where such overlapping radiation patterns are rotated with the result that the radial line of equal intensity reception of the two modulation signals constantly turns and is swept past the craft periodically. Such beacons also transmit non-directionally, in addition to the rotating patterns, a reference signal which is employed by the receiver for synchronizing or timing purposes. The reference signal may comprise a sinusoidal or pulse wave impressed upon a radio frequency carrier wave which differs from that radiated in the directive beams. When a sinusoidal reference wave is employed it is harmonically related to the rotation speed of the beams, and when a pulse wave is used for reference purposes it is transmitted in all directions at the instant when the equi-signal line of the rotating radiation patterns passes a given direction, e. g., north. The method for determining the bearing of the craft with respect to such rotary beacons has been to measure the time interval or phase rotation between the moment of reception of the reference signal and the time when the signals modulated on the two different beams balance each other, denoting the passage of the equi-signal line.

One difficulty with such equi-signal systems, both stationary and rotary, is that the condition of signal balance is negative in character and without additional safety or warning circuits cannot be distinguished from the condition when neither modulation signals are present. This latter condition may arise as a result of a failure of the transmitter or receiver or merely because the partially overlapping beams are so highly directive as not to provide appreciable energy at the receiver when the equi-signal line is momentarily pointing at a large angle away from the direction of the craft.

It is therefore the principal object of the present invention to provide simplified and improved apparatus for effectively sharpening the directivity pattern of a radio transmitter.

Another object of the present invention is to provide radio direction finding apparatus which gives a positive indication of the equi-signal line defined by two partially overlapping radio beams.

A further object of the invention is to provide improved apparatus and instrumentalities embodying novel features and principles, adapted for use in realizing the above objects and also adapted for use in other fields.

A principal feature of the present invention lies in the provision of radio receiving apparatus adapted to receive radiated waves from two partially overlapping radio beams containing characteristic waves which identify the two beams, to derive waves having frequencies which differ in correspondence with the identifying waves, to mix these waves for the purpose of obtaining waves of new frequencies, to select one of the waves of a new frequency, and to indicate a line of predetermined relative intensity of reception of the radio waves in response to a predetermined relative amplitude of the selected wave.

The invention in another of its aspects relates to novel features of the instrumentalities described herein for achieving the principal objects of the invention and to novel principles employed in those instrumentalities, whether or not these features and principles are used for the said principal object or in the said field.

Generally speaking, the invention contemplates simultaneously radiating two partially overlapping radio directivity patterns or beams for the purpose of defining a line of position in space. The beams are distinguished from each other by waves of different frequencies and are formed either by unmodulated radio waves of different frequencies or by carrier waves of the same frequency upon each of which a different amplitude modulation signal is impressed. The radio beams are received at a mobile craft, and waves differing in frequency to the same extent as the waves which characterize or identify the beams are derived. The derived waves are mixed together in an asymmetrically conducting device such as a rectifier or detector to produce, by the process of rectification, waves of new frequencies, the most important of which is a beat frequency wave, i. e., a wave having a frequency equal to the difference between the two mixed waves. One of the rectification products, preferably the beat frequency wave, is selected and supplied to an indicator or other utilization apparatus. The rectification product wave is maximized when the mobile craft lies on the line of equal intensity of the radio beams, and the peak of the wave provides a positive indication of this line of position.

It may be shown that the amplitude of a beat frequency wave obtained by linearly detecting the variations of the envelope resulting from the superposition or heterodyning of two waves of slightly different frequencies is nearly proportional to the amplitude of the smaller of the two waves applied to the heterodyne detector. See, for example, the discussion in Terman's "Radio Engineering," second edition, pages 446 to 449. Accordingly, the amplitude of the heat frequency wave derived by the presently disclosed apparatus is nearly proportional to the amplitude of the waves received from that one of the beams whose principal axis points at a greater angle from the direction in which the craft lies. When the craft is on the equi-intensity line, the beat frequency wave is at a maximum, decreasing from this peak value according to the slope, i. e., the angular rate of change of amplitude, of the more divergent beam as the angle between the direction to the craft and the direction of the equi-intensity line increases. Since the beams intersect at, say, the half-power points on their steep edges, the change of beam amplitude per degree is very much greater here than near the maxima or principal axes of the beams. Thus the amplitude of the beat frequency wave changes very much more rapidly with change in the direction of the two beams than does a wave having a directivity characteristic corresponding to a single beam. The employment of overlapping directivity patterns therefore results in a directional indication which is materially sharpened as compared to that obtainable from a single beam. At the same time the desirable positive directional indication, characteristic of a single beam, is retained as compared to the null directional indication, characteristic of conventionally utilized partially overlapping beams.

The invention will be more fully understood by reference to the embodiments illustrated in the drawing and to the following description thereof.

In the drawings,

Fig. 1 is a block diagram of a rotary beacon and receiver therefor embodying the present invention;

Fig. 2 is a wiring schematic diagram of one form of heterodyne detector which may be employed in the apparatus shown in Fig. 1;

Fig. 3 is a block diagram of an alternative form of directional transmitter and receiver exemplifying the teachings of the present invention.

Referring now to Fig. 1, there is illustrated a rotary beacon 11 adapted to transmit radio waves in partially overlapping radiation patterns from a reflector 12 which is rotated at a substantially constant speed about an axis of rotation 13 indicated as lying in the plane of the drawing. The overlapping directivity patterns are periodically swept past a craft (not shown) on which is mounted a receiver 14. The receiver 14 includes two receiving channels, 15 and 16. Energy from the rotating patterns passes through receiver channel 15 to an indicator 17. Reference signals are transmitted from a radiator 18 situated adjacent reflector 12, are received by receiver 14, and pass through channel 16 to the indicator 17. The indicator is adapted to measure the difference in time between the arrival of signals from the rotating overlapping patterns and from the substantially non-directional antenna 18. The time difference as determined in fractional periods of rotation of the reflector 12 is indicative of the direction of the craft mounting the receiving apparatus 14 from the rotary beacon transmitter 11.

Now considering the transmitter 11 in more detail, an oscillator 21 supplies a wave of substantially constant frequency to multiplier amplifiers 22 and 23 which multiply the impressed frequency by slightly different multiplication factors to supply carrier frequency waves of somewhat different frequencies, one to be radiated in the partially overlapping beams from reflector 12 and the other to be broadcast substantially non-directionally by radiator 18. The multiplier 22 supplies its high frequency wave over a cylindrical wave guide 24 to a similar wave guide 25 which is connected to a modulator circuit 26. Modulator 26 acts to separate the energy transmitted by wave guide 25 into two substantially equal parts, half the energy being supplied to a wave guide 35 and the other half to a wave guide 36. The modulator 26 further modifies the radio waves supplied to guides 35 and 36 by periodically varying their amplitudes at different frequencies.

The two guides 35 and 36 have open ends placed close together on either side of the focus 34 of the reflector 12. The open ends of guides 35 and 36 form different sources of radiation which cooperate with the common reflector 12 to form partial overlapping radiation patterns. These radiation patterns or beams, since they are formed by differently modulated radio waves may be considered to be characterized or distinguished by different frequencies, i. e., they contain identifying waves of different frequencies.

Modulator 26 may take the form of a mechanical wave guide switching device of the general type shown in application 575,415 entitled, "Waveguide Modulation Apparatus" filed Jan. 31, 1945 in the name of Frederic A. Jenks. When such apparatus is employed in modulator 26, the energy to guides 35 and 36 is periodically varied by a rotating disc or discs which are interposed in gaps between choke joints and tend to block and unblock the transmission to the guides 35 and 36. The modulating disc or discs are driven by a hollow shaft 37 which is illustrated as concentrically surrounding cylindrical wave guide 25. Fixed to shaft 37 is a pinion 38 which is meshed with a gear 39 mounted on a drive shaft 32 of a motor 33.

Reflector 12, modulator 26 and associated wave guide 25 are mounted on a rotatable platform 27. In order that guide 25 may turn relative to guide 24, a choke joint 28 of well-known construction is affixed to the ends of the guides, permitting a slight physical separation of the same without allowing high frequency energy to escape through the gap thus formed. A ring gear 29 is mounted on platform 27 and meshes with a pinion 31 attached to the shaft 32 driven by the motor 33.

The motor 33 causes the radiation patterns formed by reflector 12 and its associated wave guides 35 and 36 to turn at the same time the radiated waves are modulated by modulator 26.

It is seen that the carrier wave introduced to modulator 26 through wave guide 25 is modulated in definite frequency relationships with respect to the rotational speed of the reflector 12. The definite frequency relationships are not, however, essential to the satisfactory operation of the system. If higher modulation frequencies are desired than readily attainable by mechanical means, modulator 26 may utilize purely electronic circuits including gaseous discharge tubes to accomplish the separate modulation of the radio waves supplied to wave guides 35 and 36.

The apparatus for producing the reference signal which defines the moment when the reflector 12 is pointing in a prescribed direction is now discussed. The high frequency wave from multiplier and amplifier 23 is supplied to a modulator 43. In modulator 43 the carrier wave is modulated by a reference wave provided from a source 44. This reference wave may be sinusoidal, in which case the source 44 may take the form of an alternating current generator. On the other hand, the reference wave may be an impulse and the source 44 then includes some form of pulse wave generator. The wave produced by source 44 is synchronized with the rotation of the partially overlapping beams from reflector 12 by means of gearing 45 driven by ring gear 29 and coupled to a shaft 46 of the generator in reference source 44. The waves modulated in modulator 43 are supplied through transmission line 47 to the substantially nondirectional radiator 18.

The receiver 14 mountable in the craft has an antenna 51 which collects the radio waves from the rotary beacon transmitter 11. The received waves are mixed in a mixer 52 with a radio wave generated by a local oscillator 53. Two intermediate frequency groups of waves result, one derived from the rotating beams and the other from the nondirectional radiation of the waves containing the reference signal. An intermediate frequency amplifier 54 amplifies the waves corresponding to those contained in the rotating beams. A detector 55 coupled to the amplifier 54 reproduces the modulation signals that were impressed by modulator 26 on the transmitted waves. An audio amplifier 56 amplifies the modulation signals and supplies them to a heterodyne detector 57. The modulation signals beat together in detector 57 to produce a beat frequency signal having a frequency equal to the difference between the modulation signals. This beat frequency wave is selected by filter 58 coupled to the output of the detector and then amplified by an amplifier 59 which is preferably designed for optimum performance at the frequency of the beat note. The output of the amplifier 59 is connected to the indicator 17.

An intermediate frequency amplifier 61 amplifies the waves resulting from the reception of the energy received from the reference antenna 18. A detector 62 reproduces the reference signal which is amplified in an amplifier 63 and supplied after amplification to the indicator 17.

When the reflector 12 rotates through a given direction, say north, the reference signal, if sinusoidal, has a predetermined phase and if pulse-shaped, has its peak amplitude. This reference wave is supplied to the indicator 17 irrespective of the direction of the craft from the rotary beacon 11. The beat frequency wave, however, is only generated when the overlapping beams are pointing in the direction of the craft and the maximum of the beat frequency wave occurs when the equi-signal line sweeps past the craft. As has been discussed, the amplitude of the beat frequency wave changes very rapidly in the neighborhood of the equi-signal line and sharply defines the moment when the craft is receiving both beams with equal intensity. The indicator 17, therefore, receives two precisely defined waves and provides a directional indication of extreme accuracy.

Under certain conditions of operation the energy in the side lobes which necessarily accompany highly directive beams, may have sufficient amplitudes so that without some precaution it would be possible to obtain secondary equi-intensity lines of position. These false lines of position may be discriminated against because the beat notes created by their passage are of very much smaller amplitudes than that created by the primary or true equi-signal line. A non-ambiguous operation may be insured by preventing mixture of the reproduced modulation signals unless one of them has an amplitude a predetermined amount above its average amplitude as measured over the entire rotational cycle of the beam.

The detector 55 may take the form of the device shown in Fig. 2 to achieve this improved operation of the receiver 14. An input lead 65 from the intermediate frequency amplifier 54 is coupled to a tuned circuit 66 resonant to the intermediate frequency. Tuned circuit 66 is connected to the anode 67 of an audio detector diode 68 and also through an I. F. isolation capacitor 69 to the anode 71 of a second diode 72. The cathode 73 of audio detector diode 68 is connected through a load resistor 74 in parallel with an I. F. by-pass capacitor 75 and by way of a filter resistor 80 to a tap 76 on a voltage divider 77. The voltage divider 77 is connected between the anode 71 of diode 72 and its grounded cathode 78. A large capacitor 79 provides a low impedance path to ground for audio frequencies at the lower end of cathode load 74. The audio frequencies detected by diode 68 are supplied from the cathode 73 through a coupling capacitor 81 to an audio output lead 82.

The operation of audio detector diode 68 is conventional except that a bias is applied thereto according to the voltage drop between tap 76 and ground. This voltage is proportional to the peak of the intermediate frequency waves, i. e., the time constant of resistor 80 and capacitor 79 is long in comparison to the time of a complete rotation of the beam patterns. The position of the tap 76 on the voltage divider 77 determines the proportion of the controlled voltage developed by diode 72 that is applied as a bias to the cathode circuit of audio detector diode 68. Diode 68 cannot rectify until the impressed waves are greater than the control bias. The circuit is self-compensating for slow changes in the level of the intermediate frequency waves and always acts to reproduce the modulation envelope of only those intermediate frequency waves that have amplitudes relative to the peak amplitudes occurring during a rotation of the beams greater than some predetermined fraction.

Another embodiment of the invention is shown in Fig. 3 where the prior art means for rotating the equi-signal line and for radiating and receiving the directional reference signal are not shown for the sake of simplicity of illustration and description. The transmitter 11 of partially overlapping beams comprises sources 91 and 92 of high frequency radio waves which differ by some convenient audio frequency, say 10,000 cycles a second or higher. The waves from sources 91 and 92 are supplied over the wave guides 35 and 36, respectively, which have open mouths on either side of the focus 34 of the reflector 12.

The receiver 14, mounted in the craft, comprises the antenna 51 which supplies the radio waves to the mixer 52 wherein the waves are heterodyned with a local oscillator wave from local oscillator 53 and the two received waves are translated to an intermediate frequency band. Intermediate frequency amplifier 54 amplifies the two resultant waves and supplies them to the heterodyne detector 57 wherein the waves heterodyne to form a beat frequency wave having a frequency equal to the difference between the originally radiated waves. The audio amplifier 56 amplifies the beat frequency wave and supplies it to the indicator 17.

When the craft mounting the receiver 14 is on the equi-signal line 93, the beat note will be at a maximum and as the craft progresses to one side or the other of the equi-signal line, the amplitude of the beat note will decrease rapidly in accordance with the rapid decrease in amplitude of the weaker of the two received radio signals. In the structure of Fig. 3, the directionally sensitive beat note results from deriving a wave corresponding to the difference between the unmodulated radio wave transmitted on the beam 94 and the wave radiated on the partially overlapping beam 95, whereas in the structure of Fig. 1 the beat note was derived from beating together different modulation signals.

Although in practice it is somewhat more difficult to maintain overlapping beams 94 and 95 in balance when they are formed by radio waves derived from different generators, the structure of Fig. 3 has certain advantageous characteristics. There is no possibility of undesirable interference effects between the two beams 94 and 95 since the beams contain no similar radio frequencies. The apparatus on the craft is somewhat reduced by dispensing with a modulation signal detector. The band width of the intermediate frequency amplifier 54 may be narrower when the individual intermediate frequency waves remain unmodulated. Furthermore, it is desirable to develop a beat frequency sufficiently high so that a large number of beat frequency cycles will occur during the short moment when the equi-signal line 93 is swept past the craft. The difference between the frequencies of the radio waves from sources 91 and 92 may be readily adjusted to produce at the receiver 14 such a coherent train of beat frequency waves which is more easily selectively amplified than a few low frequency beat note waves containing relatively large transients. The beat note derived by the detector 55 in the structure of Fig. 3 is also accompanied by few spurious signals since no modulation signals are reproduced in the frequency range of the beat note.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A radio receiver adapted to provide a directional indication comprising means for receiving radio waves from two partially overlapping beams of radio energy, means for deriving from said radio energy waves having different frequencies characterizing the two beams, means for heterodyning said derived waves one with the other to produce waves of new frequencies, means for selecting one of said waves of a new frequency, and means for indicating the direction of said beams in response to the amplitude of said selected wave.

2. In a radio direction finding system, means for receiving energy radiated in two directivity patterns containing identifying waves of different frequencies, means for deriving from said received energy waves differing in frequency in correspondence to said identifying waves, means for rectifying said derived waves to produce rectification product waves, means for heterodyning said rectification product waves one with the other, and means for indicating the relative amplitudes of the energy received from said directivity patterns in terms of the relative amplitude of one of the waves produced by said heterodyning means.

3. A radio receiver adapted to determine the equal intensity direction defined by two partially overlapping beams of radio energy, said beams containing identifying waves of different frequencies, comprising means for receiving said radio energy, means for deriving from said received energy waves having frequencies which differ to the same extent as said identifying waves, means for heterodyning said derived waves one with the other to produce a beat frequency wave, and means for indicating said equal intensity direction in response to the maximum amplitude of said beat frequency wave.

4. In a radio direction finding system, means for simultaneously receiving radio waves directively radiated from separate sources, said waves being modulated by different signals, means for reproducing said modulation signals, means for mixing said reproduced signals to obtain a beat frequency wave, and means for indicating the amplitude ratio of said received waves in terms of the relative amplitude of said beat frequency wave.

5. A radio direction finding receiver adapted to indicate the equi-signal line defined by two partially overlapping beams of radio waves modulated, respectively, by modulation signals of different frequencies comprising means for receiving and demodulating said waves to reproduce said modulation signals, means responsive to said reproduced signals for detecting a wave having a frequency equal to the beat between said signals, and means for determining the equi-signal direction in response to the amplitude of said beat frequency wave.

6. A radio receiver mountable on a mobile craft and adapted to provide a directional indication comprising means for receiving radio waves of different frequencies radiated simultaneously from different sources, means for deriving from said received waves a beat frequency wave having a frequency equal to the frequency difference between said radio waves, and means for indicating a line of predetermined relative intensity of reception of said waves in response to a predetermined relative amplitude of said beat frequency wave.

7. A radio receiver adapted to determine the equal intensity direction defined by two partially overlapping directive beams of radio energy of different frequencies, comprising means for receiving said radio energy, means responsive to said received energy for producing waves having a frequency difference equal to the frequency difference of said radio energy, means for mixing said produced waves one with the other to obtain a wave having the beat frequency thereof, and means for indicating the equal intensity direction in terms of the maximum amplitude of said beat frequency wave.

8. A radio direction finding system comprising means for generating a radio frequency wave, means for modulating said wave with a plurality of frequencies, means for directionally transmitting said modulated waves to produce two partially overlapping beams having different modulation frequencies, means for receiving and detecting said waves to reproduce said modulation frequencies, means for detecting the beat note between said modulation frequencies, and means for indicating a line of predetermined relative intensity of reception of said waves in response to a predetermined relative amplitude of said beat note wave.

9. A radio direction finding system comprising means for generating two radio frequency waves, means for directively radiating one of said waves in a radiation pattern and the other of said waves in another partially overlapping radiation pattern, means for receiving and detecting said radio waves to obtain a beat frequency wave having a frequency equal to the difference therebetween, and means for indicating a line of predetermined relative intensity of reception of said waves in response to a predetermined relative amplitude of said beat frequency wave.

10. In a direction finding system, a receiver for use in connection with a radio beacon of the kind which transmits non-directional reference signals in conjunction with a rotating beam comprising two partially overlapping waves of radio energy of different frequencies, said receiver comprising means for receiving said reference signals and said radio energy, means for jointly mixing the energy received from said overlapping waves and producing beat signals therefrom and an indicating device jointly controlled by the non-directional reference signals and the beat signals.

11. In a direction finding system, a receiver for use in connection with a radio beacon of the kind which transmits non-directional reference signals in conjunction with a rotating beam comprising two partially overlapping and differently modulated waves of radio energy, said receiver comprising means for receiving and detecting said waves to reproduce the modulation frequencies thereof, means for heterodyning said modulation signals one with the other to produce a beat frequency, and direction indicating means jointly controlled by the beat note and the non-directional reference signals.

12. A radio direction finding system comprising means for generating two radio waves of different frequencies, rotatable antenna means for directively radiating one of said waves in a radiation pattern and the other of said waves in another partially overlapping radiation pattern, cooperating means for transmitting simultaneously non-directional reference signals, means for receiving said signals and said waves, means for detecting the radio waves, heterodyne means controlled thereby for producing a heat frequency wave equal to the frequency difference between the waves, and direction indicating means jointly controlled by the beat frequency wave and the non-directional signals.

13. In a radio direction finding system having two partially overlapping beams of radio energy in which each beam contains waves having a frequency different from the waves of the other beam, means for receiving said different frequency waves, means for heterodyning said received waves one with the other to produce beat frequency waves, and means responsive to the amplitude of one of said beat frequency waves for indicating equal intensity of said received waves.

JAY E. BROWDER.

REFERENCES CITED

The following references are of record in the file of this patent:

UNITED STATES PATENTS

| Number | Name | Date |
|---|---|---|
| 2,208,377 | Luck | July 16, 1940 |
| 2,297,395 | Erben | Sept. 29, 1942 |
| 2,402,410 | Kear | June 18, 1946 |
| 2,403,622 | Tuska | July 9, 1946 |
| 2,413,694 | Dingley | Jan. 7, 1947 |
| 2,419,994 | Hansell | May 6, 1947 |